(12) United States Patent
Furuyama et al.

(10) Patent No.: US 7,188,851 B2
(45) Date of Patent: Mar. 13, 2007

(54) STABILIZER FOR VEHICLE AND METHOD FOR MOUNTING THE SAME

(75) Inventors: Tsutomu Furuyama, Yokohama (JP); Jun Umeno, Yokohama (JP); Kenzo Tago, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 170 days.

(21) Appl. No.: 10/634,842

(22) Filed: Aug. 6, 2003

(65) Prior Publication Data
US 2005/0029769 A1 Feb. 10, 2005

(51) Int. Cl.
*B60G 21/055* (2006.01)

(52) U.S. Cl. .................. 280/124.107; 267/189

(58) Field of Classification Search ......... 280/124.107, 280/124.137, 124.152, 124.166; 267/188, 267/189, 276
See application file for complete search history.

(56) References Cited

U.S. PATENT DOCUMENTS

| | | | |
|---|---|---|---|
| 5,352,055 A | 10/1994 | Hellon et al. | |
| 6,474,631 B2 * | 11/2002 | Hadano et al. | 267/276 |
| 6,893,034 B2 * | 5/2005 | Fader | 280/124.166 |
| 2002/0121733 A1 * | 9/2002 | Lewis et al. | 267/189 |
| 2003/0111817 A1 * | 6/2003 | Fader et al. | 280/124.137 |

FOREIGN PATENT DOCUMENTS

| | | |
|---|---|---|
| EP | 0 405 109 A1 | 5/1990 |
| EP | 0 805 055 A | 11/1997 |
| FR | 2 411 096 | 7/1979 |
| FR | 2 564 043 A | 11/1985 |
| FR | 2 768 661 | 3/1999 |
| JP | 62-44708 | 3/1987 |
| JP | 01-106305 | 7/1989 |
| JP | 04-133907 | 12/1992 |
| JP | 07-40213 | 7/1995 |
| JP | 08-277869 A | 10/1996 |
| JP | 10-193944 | 7/1998 |
| JP | 11-210713 | 8/1999 |
| JP | 2002-002249 | 1/2002 |
| WO | WO 99/54157 | 10/1999 |

* cited by examiner

*Primary Examiner*—David R. Dunn
(74) *Attorney, Agent, or Firm*—Arent Fox PLLC

(57) ABSTRACT

A stabilizer for vehicles has a torsion portion extending in a width direction of a vehicle, arm portions extending in a forward or backward direction from both side end portions of the torsion portion, straight portions provided in a vicinity of both side end portions of the torsion portion, the straight portions extending along with an axial direction thereof, leading end portions of the arm portions, the leading end portions of the arm portions being mounted to the vehicle, and the straight portions being mounted to the vehicle via bushes, and a stopper provided at one of the straight portions, the stopper preventing the straight portions from moving more than a predetermined distance in an axial direction with respect to the bush.

18 Claims, 3 Drawing Sheets

Conventional Art

STABILIZER FOR VEHICLE AND METHOD FOR MOUNTING THE SAME

BACKGROUND OF THE INVENTION

1. Field of the Invention

The present invention relates to a stabilizer which is used for vehicles such as motor vehicles. More particularly, the present invention relates to a technique for preventing the stabilizer from sideslipping on the vehicle and for facilitating mounting operations for the stabilizer on the vehicle.

2. Description of the Related Art

Conventionally, stabilizers have been used as spring members for preventing vehicles from rolling when running at a curve. A conventional stabilizer is shown in FIG. 7. The stabilizer is equipped with a torsion portion 1 which extends in the width direction of a vehicle and arm portions 2 which extend from both side end portions of the torsion portion 1 in a forward direction of the vehicle. Both side end portions of the torsion portion 1 are mounted to a body of the vehicle. Leading end portions of the arm portions 2 are mounted to wheels of the vehicle. In this case, bushes 3 made of rubber are mounted around the torsion portion 1, and the torsion portion 1 is mounted to the body of the vehicle via the bushes 3.

When a motor vehicle with the above stabilizer runs at a curve, the body of the motor vehicle rolls to the outside of the curve due to centrifugal force. Wheels of the motor vehicle contact the road surface, and displacement of the respective arm portions 2 is thereby generated in directions opposite to each other, and a torsional moment is generated in the torsion portion 1. Elastic force which resists the torsional force is generated in the torsion portion 1, and the body of the motor vehicle is restored to a horizontal state. In this case, when the body rolls, the stabilizer moves in the width direction of the motor vehicle. As a result, the stabilizer interferes with other parts of the vehicle.

Therefore, in a conventional method, as shown in FIG. 7, stoppers 4 are provided at the inside or the outside of the bushes 3 which are around the torsion portion 1 so as to prevent the stabilizer from sideslipping. The stopper 4 is composed of a ring which is made of metal, and is fixed by welding or caulking on the torsion portion 1. For example, the stopper 4 is disclosed in Japanese Patent Unexamined Application Publication No. 11-210713.

The distance between bushes is generally about 500 to 1000 mm, which differs depending on the type of motor vehicle. The distance between a bush and a stopper is set to compensate for unevenness of the respective parts described below.

(a) Unevenness in the mounted positions of the bushes to a body of the motor vehicle
(b) Unevenness in sizes of the bushes
(c) Unevenness in positions of the stopper with respect to the stabilizer It is desirable that the design distance between the bush and the stopper (hereinafter referred to simply as "control width") be set to be zero so as to avoid the interference of the stabilizer with other parts by preventing the stabilizer from sideslipping. However, it is not practically possible to set the control width to be zero due to the above unevenness described in (a) to (c). That is, when the control width is set to be much larger, the function of preventing the stabilizer from sideslipping cannot be sufficiently obtained. Furthermore, impact loads act on the stopper when the stabilizer sideslips, whereby the position of the stopper varies. On the other hand, when the control width is small, although the above problem is relieved, it is difficult to mount the stabilizer on the vehicle. In consideration of the above problems, the control width between one side of the bush and the stopper is generally set to be 2 to 3 mm. That is, sideslip of the stabilizer may occur by 2 to 3 mm on one side of the bush due to the unevenness in (a) to (c).

However, even if the control width is set to be the above value, the sideslip distance of the stabilizer increases, and it is difficult to mount the stabilizer to the vehicle.

SUMMARY OF THE INVENTION

An object of the present invention is to provide a stabilizer for vehicles, and a method for mounting a stabilizer to a vehicle, which enable mounting a stabilizer to a vehicle easily and makes the sideslip distance of the stabilizer as small as possible.

The present invention provides a stabilizer for vehicles, comprising: a torsion portion extending in a width direction of a vehicle; arm portions extending in a forward or backward direction from both side end portions of the torsion portion; straight portions provided in a vicinity of both side end portions of the torsion portion, the straight portions extending along with an axial direction thereof; leading end portions of the arm portions, the leading end portions of the arm portions being mounted to the vehicle, and the straight portions being mounted to the vehicle via bushes; and a stopper provided at one of the straight portions, the stopper preventing the straight portions from moving more than a predetermined distance in an axial direction with respect to the bush.

According to the stabilizer for vehicles of the present invention, one of the bushes is held by the stopper, whereby sideslipping of the stabilizer is inhibited. In this case, the distance between the stopper and the bush (control width) may be set as long as a tolerance of size of the bush is considered, and the tolerance of size of the bush is extremely small, in general. Thus, the control width can be small. When the control width is small, the other bush is not held, whereby operation for mounting a stabilizer can be facilitated even if mounted positions of the bushes to a body of the vehicle are uneven. Thus, the stabilizer can be easily mounted to the vehicle, and the amount of sideslip of the stabilizer can be extremely small.

The stoppers can be respectively provided at both sides of one of the bushes. The stopper can be provided in the inside of one of the bushes. In this case, both sides of the stopper are held by inner walls of the bush.

When the stoppers are provided at both sides of one of the bushes, the following embodiments may be applied. According to an embodiment of the invention, the stopper may have a ring-shaped portion. In this case, a notch allowing the stopper to pass through the leading end portion of the arm portion may be formed in the inside of the ring-shaped portion. Alternatively, the stopper may have a C-shaped portion, and may be caulked to be fixed around the straight portion. Alternatively, the stopper may have a U-shaped portion, and may be fit to be fixed around the straight portion. For example, the stopper may be made of rubber, and may be fastened by a damper to be fixed around the straight portion.

When the stopper is provided in the inside of one of the bushes, the following may be applied. For example, a hollow portion having inner walls at both side ends thereof is formed in the bush, and the stopper is held by the inner walls.

The present invention further provides a method for mounting the above-described stabilizer for vehicles. That is, the present invention provides a method for mounting a stabilizer for vehicles, comprising: a torsion portion extending in a width direction of a vehicle; arm portions extending in a forward or backward direction from both side end portions of the torsion portion; straight portions provided in a vicinity of both side end portions of the torsion portion, the straight portions extending along with an axial direction thereof; leading end portions of the arm portions, the leading end portions of the arm portions being mounted to the vehicle, and the straight portions being mounted to the vehicle via bushes; fixing a stopper at one of the straight portions, the stopper preventing the straight portion from moving more than a predetermined distance in an axial direction with respect to the bush; mounting one straight portion, which is in the vicinity of the stopper, to the vehicle via a bush; and mounting the other straight portion to the vehicle via another bush.

The present invention can be applied to solid stabilizers and hollow stabilizers. In addition, the present invention can be applied to a type of stabilizer, of which a torsion portion is mounted to a body of a vehicle and arm portions are mounted to a part of wheels of a vehicle, and a type of stabilizer, of which a torsion portion is mounted to a part of wheels of a vehicle and arm portions are mounted to a body of a vehicle.

BRIEF DESCRIPTION OF THE DRAWINGS

FIG. 6A is a cross sectional diagram thereof, and FIG. 6B is a cross sectional diagram taken at line 6B—6B in FIG. 6A in another embodiment according to the present invention.

DESCRIPTION OF THE PREFERRED EMBODIMENTS

Figure 1:
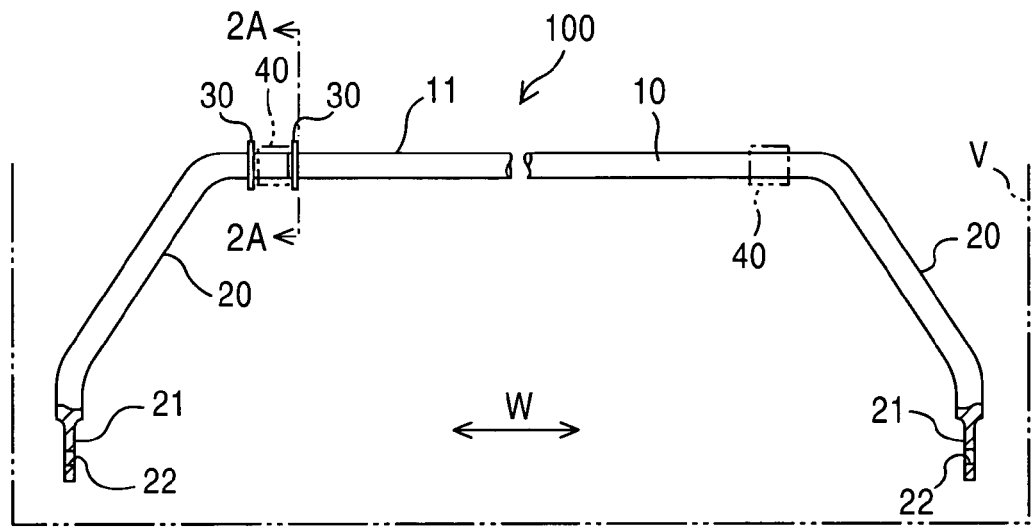
FIG. 1 is a plan view showing a stabilizer in one embodiment according to the present invention.

One embodiment of the present invention will be described hereinafter with reference to FIG. 1 to FIG. 4. FIG. 1 is a plan view showing a stabilizer 100 for vehicles (hereinafter referred to simply as "stabilizer 100") in the embodiment. In the figures, reference numeral 10 denotes a torsion portion, and the torsion portion 10 has straight portions 11 in the vicinity of both side end portions thereof. The straight portions 11 extend along with the width direction W of the vehicle V. Arm portions 20 are provided at both side end portions of the torsion portion 10, and the arm portions 20 extend in a forward direction of the vehicle V from both side end portions while the stabilizer 100 is mounted to a vehicle V. Flattened portions 21 are formed at leading end portions of the arm portions 20. The flattened portion 21 is flattened by forging, and a mounting hole 22 is provided therein. A pair of stoppers 30 is fixed around one of the straight portions 11 so as to be apart from each other in an axial direction (the width direction W).

Figure 2A:
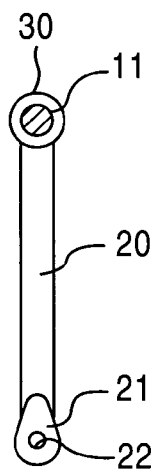
FIG. 2A is a cross sectional diagram taken at line 2A—2A in FIG. 1.
Figure 2B:
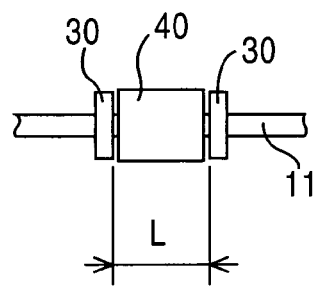
FIG. 2B is an enlarged view of a part of a bush of the stabilizer shown in FIG. 1 in one embodiment according to the present invention.
Figure 3A:
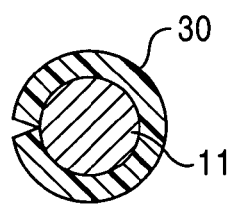
FIG. 3A is a cross sectional diagram of a stopper.

As shown in FIG. 2A, the stopper 30 has a ring-shaped portion. A distance L between the stoppers 30 is larger than the width of a bush 40 which is provided therebetween. For example, the distance L is 2 mm larger than the width of the bush 40. FIG. 3A shows details of the stopper 30. The stopper 30 has a C-shaped portion. The stopper 30 is positioned around the straight portion 11, and is caulked to be fixed therearound.

The straight portions 11 of the torsion portion 10 are mounted to a body of the vehicle V, and the flattened portions 21 of the arm portions 20 are mounted to parts of wheels of the vehicle V. When the stabilizer 100 is mounted to the vehicle V, one bush 40 is mounted around one straight portion 11 so as to be placed between the stoppers 30, the other bush 40 is mounted around the other straight portion 11. The bush 40, which is provided between the stoppers 30, is mounted to the body of the vehicle V, and then, the other bush 40 is mounted thereto in turn. Next, the flattened portions 21 are mounted to the parts of the wheels of the vehicle V Alternatively, the flattened portions 21 may be mounted to the body of the vehicle V, and then, the bushes 40 are mounted to the parts of the wheels of the vehicle V.

According to the stabilizer 100 in the embodiment, one bush 40 is held by the stoppers 30 which are fixed at both sides thereof, whereby sideslip of the stabilizer 100 is limited to 1 mm at one side of one bush 40. In addition, the other bush 40 is not held. Thus, it is easy to mount the stabilizer 100 to the vehicle V, and it is possible to make sideslip of the stabilizer 100 extremely small.

Figure 3B:
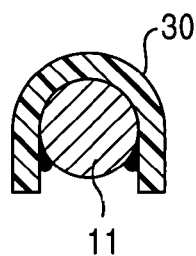
FIG. 3B and FIG. 3C are cross sectional diagrams showing another arrangement of the stopper in one embodiment according to the present invention.
Figure 3C:
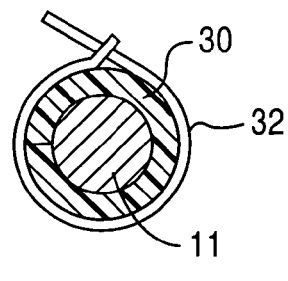
Figure 4:
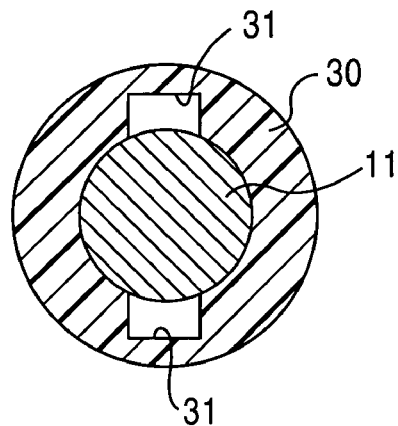
FIG. 4 is a cross sectional diagram showing another arrangement of the stopper in one embodiment according to the present invention.

Although the above embodiment is described as an example of caulking the stoppers 30 around one straight portion in the above manner, the shape of the stopper 30 is not limited to the embodiment. For example, as shown in FIG. 3B, a stopper 30 which has a U-shaped portion can be fit so as to be fixed around one straight portion 11. Alternatively, as shown in FIG. 3C, a stopper 30, which is made of rubber, can be fastened by a damper 32 so as to be fixed around one straight portion 11. Alternatively, as shown in FIG. 4, a notch 31 allowing the stopper 30 to pass through the flattened portion 21 may be formed in the inside of a stopper 30 which has a ring-shaped portion. In this case, the stopper 30 may be passed through an end portion of the stabilizer 100, and may be fixed around one straight portion 11. The stopper 30 can be fixed by arbitrary methods, for example, by caulking, by welding, or by fastening with bolts. In addition, the embodiment can be applied to solid stabilizers and hollow stabilizers.

Figure 5:
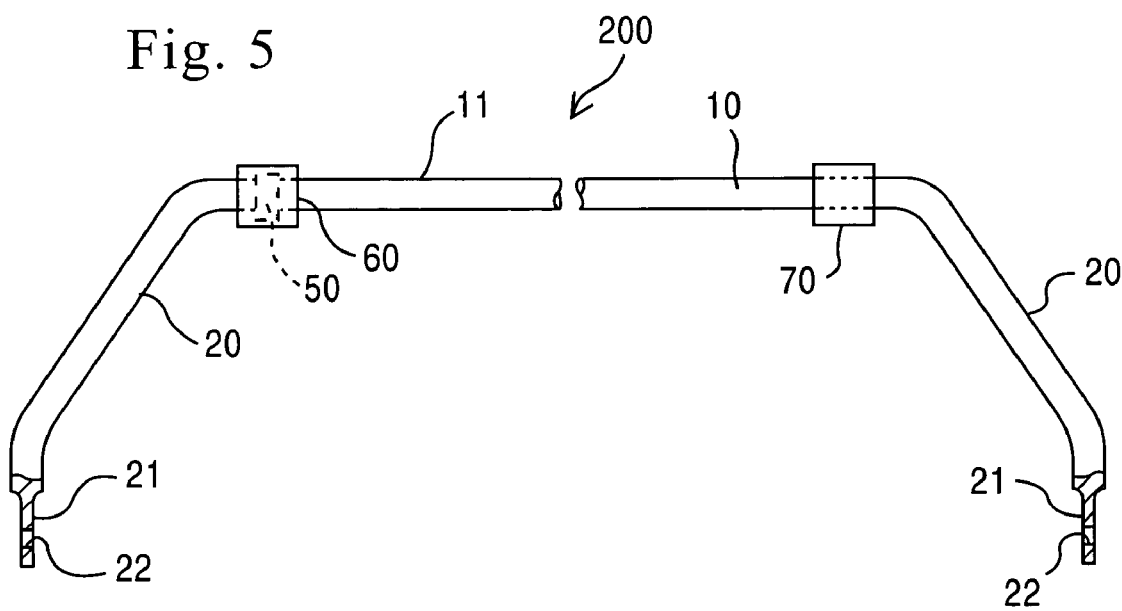
FIG. 5 is a plan view showing a stabilizer in another embodiment according to the present invention.
Figure 6A:
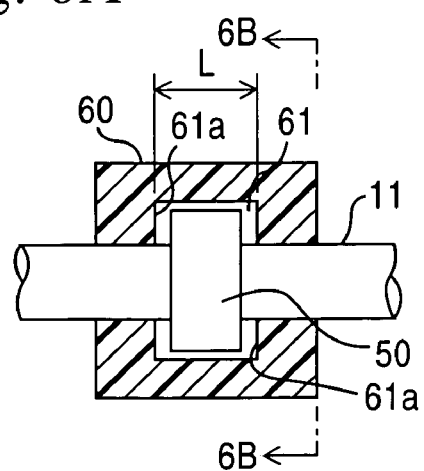
FIGS. 6A and 6B are enlarged views of a stopper and a bush in another embodiment.
Figure 6B:
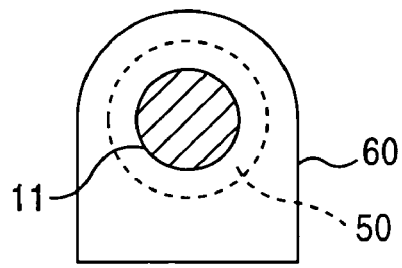
Figure 7:
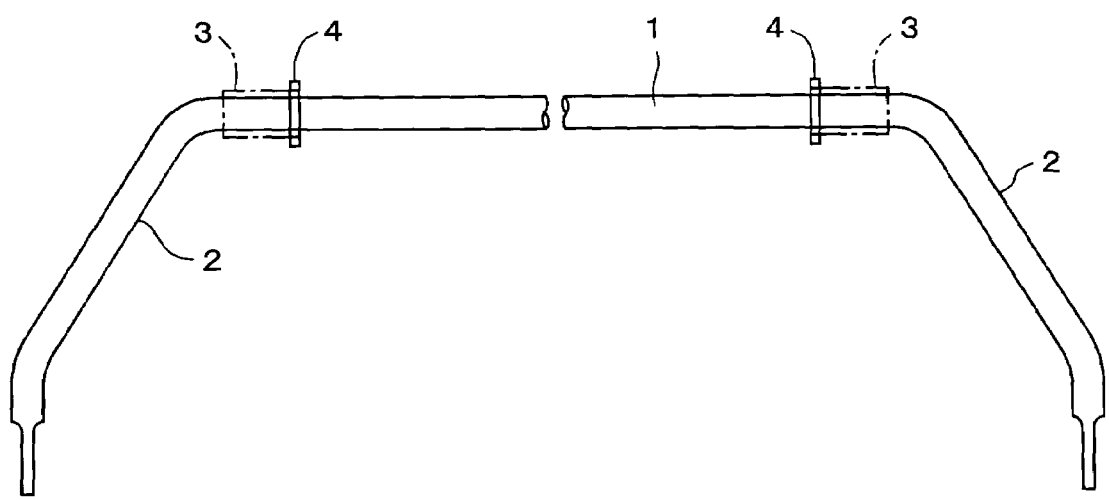
FIG. 7 is a plan view showing a conventional stabilizer.

FIGS. 5 and 6 shows another embodiment according to the present invention. FIG. 5 is a plan view showing a stabilizer 200 for vehicles (hereinafter referred to simply as "stabilizer 200") in the embodiment. In the embodiment, one stopper 50 is fixed around one straight portion 11, and a bush 60 is provided so as to pack the stopper 50. As shown in FIG. 6, a hollow portion 61 having inner walls 61a at both side ends thereof is formed in the bush 60, and the stopper 50 is held by the inner walls 61a. In this case, a distance L between the inner walls 61a is set to be larger than the width of the stopper 50. For example, the distance L is 2 mm larger than that of the stopper 50. A bush 70 is provided around the other straight portion 11, and has the same shape and size as the bush 60. The bush 70 may or may not have the hollow portion 61.

According to the above stabilizer 200, the same actions and effects as the stabilizer 100 in the aforementioned embodiment can be obtained. In particular, the stopper 50 is provided in the inside of the bush 60, whereby the stabilizer 200 can be designed so as to be compact.

What is claimed is:

1. A stabilizer for vehicles, comprising:
   a torsion portion extending in a width direction of a vehicle;
   arm portions extending in a forward or backward direction from opposite end portions of the torsion portion;
   straight portions provided proximate to the opposite end portions of the torsion portion, the straight portions extending along an axial direction thereof;
   end portions of the arm portions,
   the end portions of the arm portions being mounted to the vehicle, and the straight portions being mounted to the vehicle via bushes; and
   a stopper provided to and holding one of the bushes on one of the straight portions, the stopper preventing said one of the straight portions from moving more than a predetermined distance in the axial direction with respect to said one of the bushes, which is provided to one of the straight portions, wherein
   another one of the bushes is provided to another of the straight portions along the axial direction, wherein said another one of the bushes is provided to said another of the straight portions free from being held by any stopper.

2. The stabilizer for vehicles according to claim 1, wherein the stopper is provided to opposite sides of said one of the bushes.

3. The stabilizer for vehicles according to claim 2, wherein the stopper has a ring-shaped portion.

4. A stabilizer for vehicles according to claim 3, wherein a notch allowing the stopper to pass through the leading end portion of the arm portion is formed in the inside of the ring-shaped portion.

5. The stabilizer for vehicles according to claim 2, wherein the stopper has a C-shaped portion and is caulked around said one of the straight portions.

6. The stabilizer for vehicles according to claim 2, wherein the stopper has a U-shaped portion and is fit to said one of the straight portions.

7. A stabilizer for vehicles according to claim 2, wherein the stopper is made of rubber and is fastened by a damper to be fixed around said one of the straight portions.

8. A stabilizer for vehicles according to claim 1, wherein the stopper is provided in the inside of said one of the bushes.

9. A stabilizer for vehicles according to claim 8, wherein a hollow portion having inner walls at both side ends thereof is formed in said one of the bushes and the stopper is held by the inner walls.

10. A method for mounting a stabilizer for vehicles, the stabilizer including:
    a torsion portion extending in a width direction of a vehicle;
    arm portions extending in a forward or backward direction from opposite end portions of the torsion portion;
    straight portions provided proximate to opposite end portions of the torsion portion, the straight portions extending along an axial direction thereof;
    end portions of the arm portions; and
    the end portions of the arm portions being mounted to the vehicle, and the straight portions being mounted to the vehicle via bushes,
    the method comprising the steps of:
    fixing a stopper to one of the straight portions, the stopper preventing said one of the straight portions from moving more than a predetermined distance in the axial direction with respect to one of the bushes which is provided to said one of the straight portions, wherein the stopper holds said one of the bushes on said one of the straight portions;
    providing another one of the bushes to another of the straight portions along the axial direction, wherein said another one of the bushes is provided to said another of the straight portions free from being held by any stopper;
    mounting said one of the straight portions, which is proximate to the stopper, to the vehicle via said one of the bushes; and
    mounting said another of the straight portions to the vehicle via said another of the bushes.

11. The method for mounting a stabilizer for vehicles according to claim 10, wherein the stopper is provided to opposite sides of said one of the bushes.

12. The method for mounting a stabilizer for vehicles according to claim 11, wherein the stopper has a ring-shaped portion.

13. A method for mounting a stabilizer for vehicles according to claim 12, wherein a notch allowing the stopper to pass through the leading end portion of the arm portion is formed in the inside of the ring-shaped portion.

14. The method for mounting a stabilizer for vehicles according to claim 11, wherein the stopper has a C-shaped portion and is caulked around said one of the straight portions.

15. The method for mounting a stabilizer for vehicles according to claim 11, wherein the stopper has a U-shaped portion and is fit to said one of the straight portions.

16. A method for mounting a stabilizer for vehicles according to claim 11, wherein the stopper is made of rubber and is fastened by a damper to be fixed around said one of the straight portions.

17. A method for mounting a stabilizer for vehicles according to claim 10, wherein the stopper is provided in the inside of said one of the bushes.

18. A method for mounting a stabilizer for vehicles according to claim 17, wherein a hollow portion having inner walls at both side ends thereof is formed in said one of the bushes and the stopper is held by the inner walls.

* * * * *